US007106435B2

(12) United States Patent
Nelson

(10) Patent No.: US 7,106,435 B2
(45) Date of Patent: Sep. 12, 2006

(54) HYPERSPECTRAL SCENE GENERATOR AND METHOD OF USE

(75) Inventor: Neil R. Nelson, Anaheim, CA (US)

(73) Assignee: DRS Sensors & Targeting Systems, Inc., Cypress, CA (US)

(*) Notice: Subject to any disclaimer, the term of this patent is extended or adjusted under 35 U.S.C. 154(b) by 344 days.

(21) Appl. No.: 10/802,713

(22) Filed: Mar. 17, 2004

(65) Prior Publication Data

US 2004/0184033 A1 Sep. 23, 2004

Related U.S. Application Data

(60) Provisional application No. 60/492,390, filed on Aug. 4, 2003, provisional application No. 60/455,232, filed on Mar. 17, 2003.

(51) Int. Cl.
*G01J 3/00* (2006.01)
*G01J 3/10* (2006.01)

(52) U.S. Cl. .................... 356/300; 356/330; 356/243.1

(58) Field of Classification Search ................ 356/300, 356/310, 330, 243.1
See application file for complete search history.

(56) References Cited

U.S. PATENT DOCUMENTS

| | | | | |
|---|---|---|---|---|
| 6,128,077 | A * | 10/2000 | Jovin et al. | 356/310 |
| 6,208,752 | B1 | 3/2001 | Palmadesso et al. | 382/155 |
| 6,282,301 | B1 | 8/2001 | Haskett | 382/103 |
| 6,859,275 | B1 * | 2/2005 | Fateley et al. | 356/330 |
| 2002/0015151 | A1 | 2/2002 | Gorin | 356/303 |
| 2002/0154300 | A1 | 10/2002 | Mansfield et al. | 356/300 |
| 2002/0193971 | A1 | 12/2002 | Whitsitt et al. | 782/189 |
| 2003/0096425 | A1 | 5/2003 | Berk et al. | 436/171 |

* cited by examiner

*Primary Examiner*—F. L. Evans
(74) *Attorney, Agent, or Firm*—Sonnenschein Nath & Rosenthal LLP

(57) ABSTRACT

A hyperspectral scene generator generates a projected linear scene where the spectral characteristics at each location that forms the scene are dynamically and arbitrarily controllable. The generator can be controlled to generate a projected linear scene including a targeted object and arbitrary spectral content that duplicates the spectral content of real targets and backgrounds to facilitate testing of target identification software of a hyperspectral imaging system in view of expected actual field operation of the sensor of the imaging system.

8 Claims, 3 Drawing Sheets

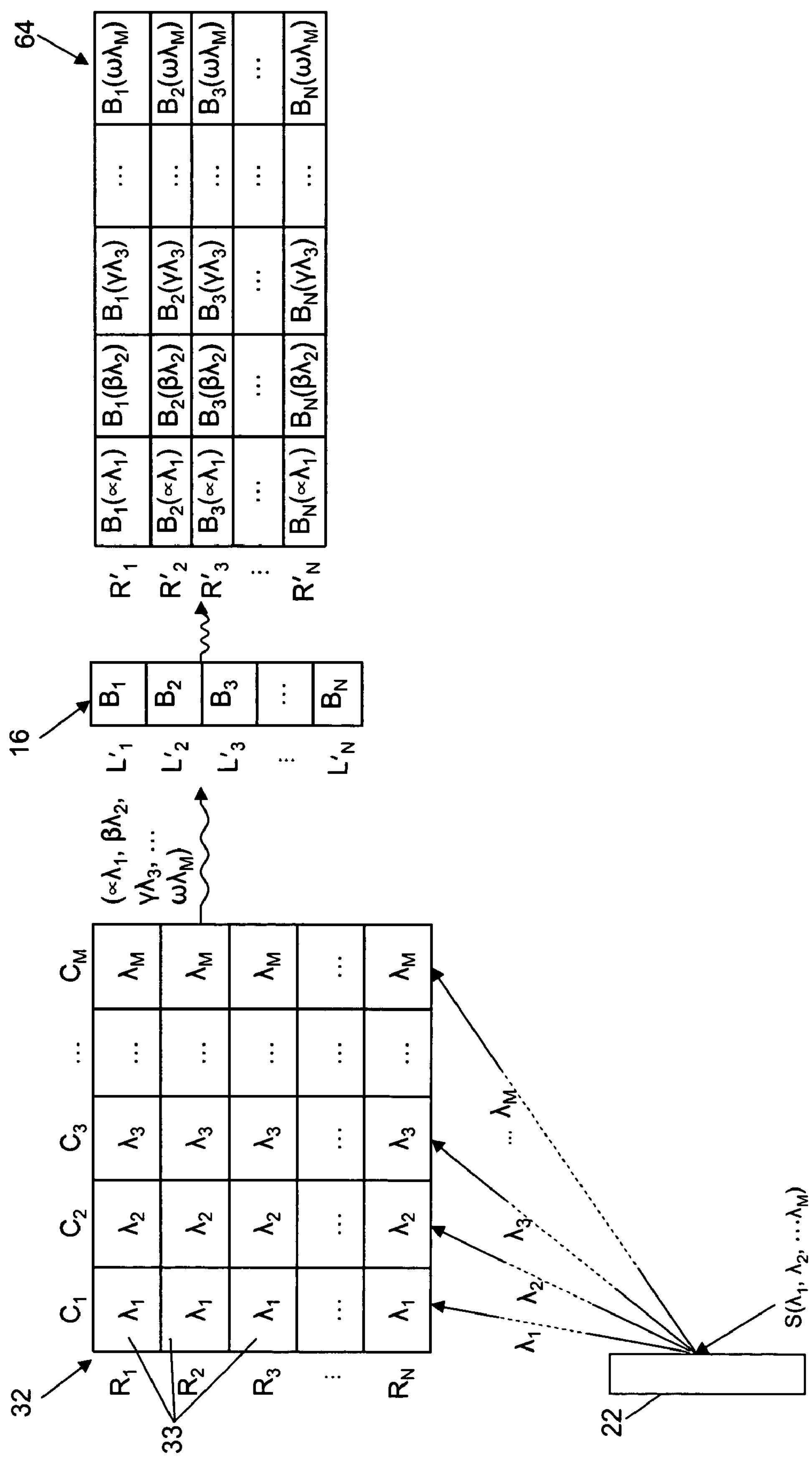
FIG. 3
64
16
32
33
22
$C_1$
$C_2$
$C_3$
...
$C_M$
$R_1$
$R_2$
$R_3$
...
$R_N$
$\lambda_1$
$\lambda_2$
$\lambda_3$
$\lambda_M$
... $\lambda_M$
$S(\lambda_1, \lambda_2, \cdots \lambda_M)$
$(\propto\lambda_1, \beta\lambda_2, \gamma\lambda_3, \ldots \omega\lambda_M)$
$L'_1$
$L'_2$
$L'_3$
...
$L'_N$
$B_1$
$B_2$
$B_3$
...
$B_N$
$R'_1$
$R'_2$
$R'_3$
...
$R'_N$
$B_1(\propto\lambda_1)$
$B_1(\beta\lambda_2)$
$B_1(\gamma\lambda_3)$
$B_1(\omega\lambda_M)$
$B_2(\propto\lambda_1)$
$B_2(\beta\lambda_2)$
$B_2(\gamma\lambda_3)$
$B_2(\omega\lambda_M)$
$B_3(\propto\lambda_1)$
$B_3(\beta\lambda_2)$
$B_3(\gamma\lambda_3)$
$B_3(\omega\lambda_M)$
$B_N(\propto\lambda_1)$
$B_N(\beta\lambda_2)$
$B_N(\gamma\lambda_3)$
$B_N(\omega\lambda_M)$

HYPERSPECTRAL SCENE GENERATOR AND METHOD OF USE

CROSS REFERENCE TO RELATED APPLICATIONS

This application claims the benefit of U.S. Provisional Application No. 60/455,232, filed Mar. 17, 2003 and U.S. Provisional Application No. 60/492,390, filed Aug. 4, 2003, each of which is assigned to the assignee of this application and incorporated by reference herein.

FIELD OF THE INVENTION

The present invention relates generally to hyperspectral imaging systems and, more particularly, to generating a projected linear scene for testing radiometric and target identification performance of a hyperspectral imaging system.

BACKGROUND OF THE INVENTION

A hyperspectral imaging system operates to identify a targeted object solely based upon detection of energy reflected from or thermally generated by the object. The hyperspectral imaging system typically includes a linear field of view hyperspectral sensor containing a single pixel, or one or more rows of pixels, which can detect optical energy having wavelength bandwidths spanning, for example, the UV/visible through the MWIR and LWIR ranges. In addition, the hyperspectral imaging system usually includes target identification software that operates to automatically acquire, identify, classify and track a targeted object based on the spectral energy detected at the pixel or pixels of the sensor. For example, in a military application, a hyperspectral imaging system can differentiate between detected spectral characteristics representative of camouflage paint and foliage to determine that a military target is present in an imaged region. In addition, a hyperspectral imaging system can evaluate detected infrared spectral signatures to determine that certain biochemical agents are present within an imaged region.

Testing of early prior art hyperspectral imaging systems, which typically did not have any accompanying target identification software, primarily involved calibrating the sensor. In a calibration test, the radiometric performance of the sensor, which includes physical performance parameters such as sensitivity, resolution and spectral sensitivity, is evaluated. Based on the results of radiometric performance testing, the operation of sensors of different hyperspectral imaging systems could be compared.

With the improvement of imaging technologies, target identification software began to be included in a hyperspectral imaging system. Advanced hyperspectral imaging systems now include highly complex target identification software which has the capability to process the very large amounts of spectral data likely to be collected in current hyperspectral imaging system applications. For example, in a typical military application, the hyperspectral imaging system must be able to process the large amounts of spectral data that would be collected based on the presence of a countermeasure that is placed in an imaged region to conceal a targeted object and which causes the sensor to detect a plurality of spectral characteristics that normally would not be present in the imaged region. In addition, a substantial amount of spectral data must be processed to identify the presence of an object in an imaged region where the energy radiated from the object occupies less than the size of a pixel of a sensor of a hyperspectral imaging system. As the target software became an integral part of the hyperspectral imaging system, testing of a hyperspectral imaging system now required, in addition to calibrating the sensor, evaluating how well the target software identified or otherwise extracted target and position information from the spectral data collected by the sensor.

In the prior art, the complex target software is usually tested independently of the operation of the hyperspectral sensor itself. In common prior art testing of the target software, test software creates a digital representation of the spectral emissions or reflections expected to occur in a region containing a target and the digital representation is used to validate the target software. This isolated testing of the target software is not always adequate and accurate because it assumes (i) that the effects upon the sensor of any non-linear mixing of spectrum, which occurs when one object reflects optical energy onto another object, can be ignored; and (ii) that the sensor does not include an anomaly that would cause the targeting software to be less effective. Thus, the independent testing of the target software does not detect and compensate for any hyperspectral sensor anomaly, which can lead to potentially invalid test results concerning the overall operation of the hyperspectral imaging system.

In addition, laboratory or bench test scene generation systems that were developed in the prior art can project a predetermined scene including a target to a hyperspectral imaging system to provide that the sensor and the target software functionalities can be evaluated. Such prior art bench testing systems, however, only provide that a limited number of different scenes including a target can be projected and do not permit dynamic and arbitrary control of the spectral and spatial characteristics of a projected scene. See D. B. Beasley, D. A. Saylor, J. Buford, "Overview of Dynamic Scene Projectors at the U.S. Army Aviation and Missile Command," *Proc. SPIE* Vol. 4717, pp. 136–147, April 2002, incorporated by reference herein. As a result, current bench testing techniques do not provide that the spectral and spatial characteristics of a projected scene can be sufficiently controlled, such that testing of a hyperspectral imaging system can be performed using a projected scene that simulates all of the spectral and spatial parameters that may exist in a natural scene.

In view of the limitations of the bench testing systems, actual field testing, such as placing a hyperspectral imaging system in an airplane and flying the system over a natural scene including a test target, has become a standard method for testing and demonstrating the performance of a hyperspectral imaging system. Such field testing, however, is costly and often is unrepeatable and uncontrollable. Moreover, in many circumstances, even a flight field test may not provide the variety or the correct background spectral signatures required to test an application of the hyperspectral imaging system.

Thus, the various prior art hyperspectral imaging system testing techniques cannot test the system repeatedly under controlled conditions that simulate the spectral and spatial characteristics expected to exist in a natural scene including a target, and that can also determine whether a spectral variation that sometimes may be present in a natural scene will cause the target software to fail to identify the target in such modified natural scene.

Therefore, a need exists for system and method for generating a projected linear scene having spectral and spatial characteristics that can be arbitrarily and dynamically controlled where the system and method can be implemented in a laboratory setting to perform repeatable testing of a hyperspectral imaging system for both radiometric and target identification software performance.

SUMMARY OF THE INVENTION

In accordance with the present invention, a hyperspectral scene generator for generating a projected linear scene having arbitrarily and dynamically controllable spectral and spatial characteristics includes a controllable deformable array of mirrors to which spectral bands having respective predetermined positions across a spatial axis are directed and where each mirror of the array is movable to reflect or not reflect the spectral band or bands directed to the mirror. The mirrors of the array are individually moved in accordance with scene data representative of a simulation linear scene, where the simulation scene has a plurality of scene locations and each of the scene locations includes at least one spectral band at a predetermined power level. The spectral bands selectively reflected by the mirrors in a same row of the array are used to form a predetermined projection location of a projected linear scene, where the projection location has the same spectral characteristics as a corresponding scene location of the simulation scene.

In a preferred embodiment, the hyperspectral scene generator projects a linear scene upon a collimator which is positioned to focus the scene upon a sensor of an imaging system, such as an infrared or hyperspectral imaging system, under test. Thus, the projected linear scene generated by the inventive generator, and the simulation scene data used to generate the projected scene, can be used to test the target identification software of the hyperspectral imaging system in view of the expected actual operation of the sensor of the hyperspectral imaging system in the field.

In a preferred embodiment, a hyperspectral scene generator is implemented using the optical components and the optical energy propagation path configuration of a conventional Offner imaging spectrometer, such as described in U.S. Pat. No. 5,880,834, incorporated by reference herein, where a controllable deformable mirror array occupies the place of the sensor in the Offner spectrometer. The mirrors of the array are positioned to receive the spectral bands that the convex dispersion grating included in the Offner spectrometer ordinarily directs to the pixel array of the sensor. Pulse width modulation is used to selectively control movement of the individual mirrors of the array between a reflection and non-reflection position for simulating predetermined power levels associated with spectral bands of respective scene locations. Based on a duty cycle selected for movement of a mirror, a pixel of a sensor of hyperspectral imaging system, which is positioned to receive the spectral band reflected by the mirror and forming a predetermined location of a projected linear scene, would detect, during an integration period of the sensor of the system, a predetermined amount of energy that corresponds to a power level of a corresponding location of a simulated scene.

In a preferred embodiment, the mirrors of the array are moved for generating a projected linear scene that simulates realistic background and target scenarios and dynamics which are either physically inaccessible or not currently available at a natural scene or difficult to create in a natural scene.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which:

FIG. 3 is an illustration of operation of the hyperspectral scene generator of FIG. 2 for generating a projected linear scene for detection at and testing of a hyperspectral imaging system, in accordance with the present invention.

DETAILED DESCRIPTION OF THE INVENTION

Figure 1:
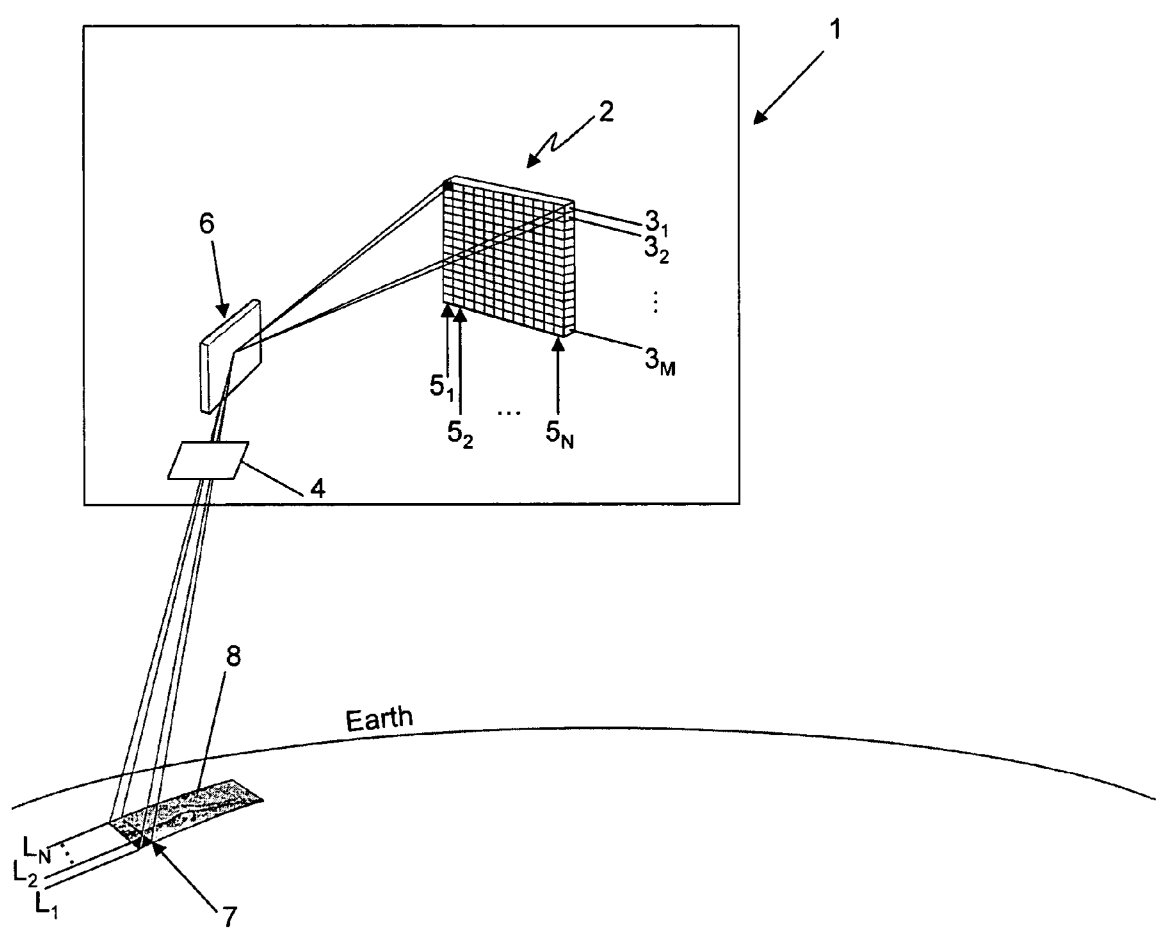
FIG. 1 is an illustration of imaging of a region by an exemplary prior art hyperspectral imaging system.

Exemplary operation of a typical prior art hyperspectral imaging system is briefly summarized at the outset to provide a reference for the description of the features of the present invention of a hyperspectral scene generator which can generate a projected linear scene having selected spectral bands at each of a plurality of projection locations that form the projected scene. See J. Marmo, et al., "The Lewis Hyperspectral Imager Payload Development," Proceedings of SPIE, Vol. 2819, pp. 80–90 (1996) for a detailed description of hyperspectral imaging system construction and operation, incorporated by reference herein. Referring to FIG. 1, the typical prior art hyperspectral imaging system 1 includes a sensor 2, such as a two dimensional focal plane array, containing rows $\mathbf{3}_{1,2, \ldots M}$ and columns $\mathbf{5}_{1,2, \ldots N}$ of pixels. Optical energy radiated from locations $L_{1,2, \ldots N}$ extending along an imaged linear field of view 7 of a region 8 enters the hyperspectral system 1 through a straight slit 4 which defines a spatial axis. The optical energy entering the slit 4 then propagates through a spectral dispersive device 6, such as a diffractive grating, and then through an optics module (not shown). The slit 4, the dispersive device 6 and the optics module, in combination, provide that the energy radiated from the locations L of the imaged linear field of view 7 is projected onto the pixels of the array, where each imaged location $L_i$ is spectrally dispersed into the pixels of a discrete row $\mathbf{3}_i$ of the array. For example, the pixels in the row $\mathbf{3}_1$ of the array, i.e., the pixels $\mathbf{3}_1,\mathbf{5}_1$, $\mathbf{3}_1,\mathbf{5}_2$, . . . $\mathbf{3}_1,\mathbf{5}_N$ of the array, detect the spectral characteristics of the energy radiated from location $L_1$ of the imaged linear field of view 7. A target identification software module (not shown) in the hyperspectral imaging system 1 processes data representative of the spectral characteristics detected at the pixels of the rows 3 to determine whether the detected spectral characteristics are those of a targeted object. As described in detail below, the hyperspectral scene generator of the present invention, based on scene data representative of spectral and spatial parameters defining a simulated linear scene, can generate a projected linear scene where each location in the projected scene has selected spectral characteristics at a predetermined power level. Based on the projected scene generated by the inventive hyperspectral scene generator, and also the scene data used by the generator to generate the projected scene, the operation of the sensor, namely, the individual pixels, and the performance of the target identification software in the hyperspectral imaging system can be readily tested together, repeatedly and controllably, in a laboratory setting, with relative ease and at relatively low cost.

Figure 2:
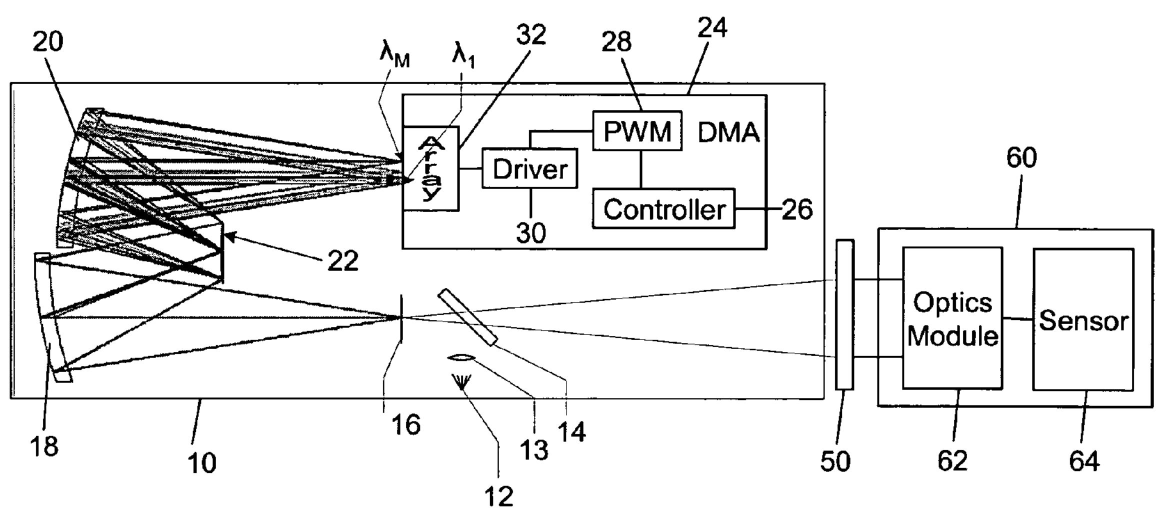
FIG. 2 is a block diagram of a hyperspectral scene generator, in accordance with the present invention, which is positioned for testing a hyperspectral imaging system.

FIG. 2 illustrates a preferred embodiment of a hyperspectral scene generator 10, in accordance with the present invention, for generating a projected linear scene having selected spectral components at each of a plurality of locations that form the projected scene. Referring to FIG. 2, the illustrated generator 10 is realized using a configuration that is the substantially the same as, and includes many of the same components that are included, in an Offner imaging spectrometer, except that a mirror array 32, which includes a plurality of mirrors 33 arranged in rows and columns, occupies the place of the sensor of the Offner spectrometer and where the mirrors 33 of the array 32 are positioned at the respective positions normally occupied by the pixels of the Offner spectrometer sensor. See U.S. Pat. No. 5,880,834 regarding Offner spectrometer construction and operation, incorporated by reference herein. The position of each of the mirrors 33 included in the array 32 is electronically controllable and, as described in detail below, an individual mirror 33 is selectively moved to control whether or not the mirror 33 reflects optical energy directed to the location in the array 32 occupied by the mirror 33 toward or away from the mirror 20.

Referring again to FIG. 2, the generator 10 includes a broadband optical energy source 12 positioned adjacent to an imaging lens 13. A beam splitter 14 is positioned to direct 50% of the light from the imaging lens 13 toward an adjustable slit 16. In addition, the generator 10 includes concave mirrors 18 and 20 and an energy dispersive device 22. The devices 16, 18, 20 and 22 are devices ordinarily included in an Offner spectrometer, and function in the generator 10 to propagate optical energy in the same manner as in the Offner spectrometer. Thus, any optical energy that is received at the slit 16 is directed to the mirrors 33 of the mirror array 32 in substantially the same manner that optical energy received at the slit 16 in an Offner spectrometer would be directed to the pixels in the sensor in the Offner spectrometer.

The devices 16, 18, 20 and 22 can be any conventional optical component having the functionality respectively required for facilitating propagation of optical energy in an Offner spectrometer configuration, as is well known in the art. For example, the adjustable slit 16 is any device that provides a linear field of view where the width of the slit is adjustable. In addition, the dispersion device 22 is any suitable device, such as a convex grating or a wedge in a dispersive glass, that can operate (i) to disperse the received optical energy into spectral bands and spatially direct the spectral bands away from the device 22; and (ii) to combine the spectral bands reflected from the DMA and direct them away from the device 22.

The broadband optical energy source 12 is any conventional optical energy radiation source, such as a tunable visible, IR or laser source, etc., which can be used to radiate optical energy at desired bandwidths and power levels.

The lens 13 can be any conventional device having the functionality of imaging the source 12 onto the adjustable slit 16.

The beamsplitter 14 can be any conventional device having the functionality of directing optical energy from the source 12 to the adjustable slit 16 and passing optical energy emitted from the slit 16 toward the collimator 50.

In accordance with the present invention, the mirror array 32 included in the generator 10 is part of a deformable mirror array ("DMA") module 24. The DMA module 24 can be any conventional optical energy reflection device which includes an array of movable mirrors and which is programmable for electronically controlling the position of each mirror in the array to provide for reflection or no reflection of the optical energy directed at the location in the mirror array occupied by the mirror. The DMA module 24, for example, can be a Digital Micromirror Device, such as sold by Texas Instruments and described in Hornbeck, L. J., "Current Status and Future Applications for DMD™—Based Projection Displays," presented at International Electron Devices Meeting 1993, Technical Digest, Washington, D.C., USA 1993, incorporated by reference herein, or any other electromechanical micromirror array system known in the art.

Referring to the preferred illustrated embodiment of the generator 10 shown in FIG. 2, the DMA module 24 includes a controller 26 electronically coupled to a pulse width modulator ("PWM") 28 which in turn is electronically coupled to a mirror driver 30. The driver 30 is electronically coupled to each of the mirrors 33 of the mirror array 32. The controller 26 preferably includes a processor and a memory (not shown) for storing executable instructions representative of conventional mirror positioning control software algorithms. The processor of the controller 26, using scene data representative of a simulated linear scene, performs the stored algorithms for generating mirror position data. Based on the mirror position data, the individual mirrors of the array are selectively moved to reflect only those spectral bands required to generate a projected linear scene corresponding to the simulated scene represented by the scene data. In other words, the controller 26 generates the mirror position data to provide for generation of a projected linear scene that has spectral and spatial characteristics corresponding to those of a simulated scene.

In a preferred embodiment, each of the mirrors 33 in the mirror array 32 is part of a conventional device which provides that the angle or tilt of the mirror is digitally controllable. In one preferred embodiment, each mirror in the array is configured as a bi-stable device where the mirror can only rest at an angled first state at +12 degrees relative to a neutral axis or at an angled second state at −12 degrees relative to the neutral axis, and is unstable when not angled. As each of the mirrors 33 of the array 32 is located at a position in the generator 10 to which selected spectral band energy is directed, the tilt of a mirror determines whether the mirror reflects substantially all or none of the optical energy which is directed to the location in the array containing the mirror.

The PWM 28 is any prior art switching device that can generate, based on mirror position data, a switching signal having a desired duty cycle. The duty cycle is a function of an integration period of a hyperspectral imaging system that the generator 10 can be used to test. The PWM 28, based on mirror position data supplied by the controller 26, supplies to the mirror driver 30 switching signals having predetermined duty cycles for controlling the positions of the mirrors 33 in the array 32. Based on the supplied switching signals, the mirror driver 30 moves an individual mirror between (i) a first position (state) for reflecting substantially all of the spectral band directed to the mirror, and (ii) a second position where substantially none of the spectral band directed to the mirror is reflected. Thus, the duty cycle of a switching signal determines the power level of the optical energy that a pixel of a hyperspectral sensor of a hyperspectral imaging system would detect during an integration period of the system, where the pixel is located at a predetermined location of a projected linear scene to which spectral bands reflected by selected mirrors of the array are projected. Consequently, the generator 10 can provide that a location of a projected linear scene simulates a scene location of a simulated scene including spectral bands at predetermined power levels.

In an alternative preferred embodiment, the driver 30 can supply mirror driving signals that provide for movement of an analog mirror of the mirror array to any position within an available mirror movement range to achieve varying power levels.

Exemplary operation of the generator 10 for testing a hyperspectral spectral system 60 is described below in connection with FIG. 2 and FIG. 3. FIG. 3 shows features of optical energy propagation from the dispersion device 22, to the mirror array 32 and then to the slit 16, omitting the contribution of the mirrors 18 and 20 to the propagation of the optical energy for clarity and highlighting the operation of the inventive generator 10. Referring to FIG. 2, the dispersion device 22 is positioned at the focal plane of the collimator 50 and the system 60 is positioned in relation to the exit aperture of the collimator 50. The system 60 includes an optical energy routing module 62, which is a conventional optical component including an optical slit and a grating, and a sensor 64 including a two dimensional array of pixels. The system 60, for example, can constitute a conventional dispersive imaging system that scans a line or a region and has spectral ranges defined between about 0.40 and 13.5 μm, a field of view defined between 0.624° and 60°, a spectral resolution of between about 7.75 nm and 100 nm, about 126–256 spectral bands, a spatial resolution of between about 0.04255 mrad and about 2 mrad, about 128–1600 spatial pixels, an aperture between about 31–145 mm, a frame rate of between about 20–250 Hz and pushbroom image acquisition capabilities. As discussed in detail below, the generator 10 is operated to have the mirrors 33 of the array 32 reflect selected spectral bands which form a projected linear scene that the combination of the collimator 50 and the optics module 62, in turn, focuses upon the array of pixels of the sensor 64.

Referring to FIG. 2, the source 12 radiates optical energy having a predetermined bandwidth toward the lens 13. The lens 13 directs the energy to the beam splitter 14, which in turn directs a portion of the radiated energy toward the adjustable slit 16. The slit 16 defines the linear field of view and passes light onto the mirror 18, and the mirror 18 reflects the light S toward the dispersion device 22. Referring to FIGS. 2 and 3, the dispersion device 22 disperses the light S into a plurality of spectral bands $\lambda_1, \lambda_2, \ldots \lambda_M$. For purposes of the example, it is assumed that the light S includes energy in each of the spectral bands $\lambda_1, \lambda_2, \ldots \lambda_M$, although S can include only a few of the spectral bands that constitute the dispersion bands for the device 22. The spectral bands $\lambda_1, \lambda_2, \ldots \lambda_M$ are respectively spatially directed to the mirror 20, which then spatially directs the respective spectral bands toward the array 32. Referring to FIG. 3, the mirror array 32 includes N rows R and M columns C of mirrors 33, where N and M can have any desired or available value to provide an array size of, for example, 1024×768, 1280×1024 or 2048×1080. Each mirror 33 in the array 32 is any desired and available size, and preferably is 13.7 um, has a 90% fill factor and is a bi-stable mirror having a switching speed of about 10 microseconds between the two positions of the mirror.

In accordance with the present invention, the mirror array 32 is arranged relative to the dispersion device 22 to provide that the spectral band $\lambda_1$ is directed to the mirrors located in column $C_1$ of the array 32, the spectral band $\lambda_2$ is directed to the mirrors located in column $C_2$ of the array 32, and so on, as shown in FIG. 3. The controller 26, based on scene simulation data stored in its memory, or supplied to it from an external data device using conventional techniques well known in the art, generates mirror position data and supplies this data to the PWM 28. The mirror position data is derived from scene data representative of, for example, known, synthesized or acquired spectral signatures of backgrounds and targets. The mirror position data provides that the individual mirrors of the mirror array are moved to selectively reflect the spectral bands directed to the locations in the array containing the mirrors.

The PWM 28, based on the mirror position data, generates switching signals that are supplied to the driver 30. Based on the switching signals supplied for a particular mirror, the driver 30 controls how long the mirror is moved to a reflection or ON position, such as at +12 degrees, or to a non-reflection or OFF position, such as at −12 degrees, during the integration period of the sensor 64. Thus, the switching signals determine how long, if at all, during an integration period of the system under test, a mirror would be positioned to reflect the spectral bands directed to the location of the array containing the mirror and, therefore, provide a reflected spectral band that could be used to form a location of a projected linear scene having a power level corresponding to a scene location of a simulated linear scene. For example, a switching signal having a fifty percent duty cycle would provide for reflection of the spectral band directed to a mirror for only one-half of an integration period of the sensor 64, such that the power level of the spectral band that becomes a part of the projected scene simulates a desired lower power level than the output power level of the source 12. The duty cycle is, thus, generated to satisfy the scene data requirements and in relation to the output power of the source 12 and also any transmission loss associated with propagation of the energy radiated from the source 12 to the array 32 within the generator 10.

Referring again to FIGS. 2 and 3, at the array 32, the reflections of the mirrors located in a single row R of the array 32 determine the spectral characteristics to be projected upon and, therefore, detected by a single pixel of the hyperspectral system 60 under test. For example, if all of the spectral bands $\lambda_1, \lambda_2, \ldots \lambda_M$ were to be included at a location of a projected linear scene, then all of the mirrors of a row of the mirror array, such as all of the mirrors located in the row $R_1$ of the array 32, would be positioned in the ON (reflection) position for at least some portion of an integration period. As a result, the mirrors in the row $R_1$ of the array 32 would respectively reflect the spectral bands directed thereto and the reflected spectral bands would then be imaged upon the mirror 20. The mirror 20 would then image the reflected spectral bands to the dispersion device 22 which would combine the spectral bands and then direct the combined spectral band toward the mirror 18, which would then reflect the energy toward to the slit 16. At the slit 16, a spectral distribution $B_1$, which includes the spectral band reflections from all of the mirrors located in row $R_1$ of the array 32, would pass through a location $L'_1$ of the spatial axis of the slit 16. The spectral distribution $B_1$ would include the spectral components $\alpha\lambda_1, \beta\lambda_2, \ldots \omega\lambda_M$, where $\alpha, \beta, \ldots \omega$ constitute suitable attenuation factors between 0 and 1 and where the attenuation factor is determined based on the scene data requirement. Similarly, the spectral distributions $B_{2\text{-}N}$ which include the spectral band reflections from the respective mirrors located in the rows $R_{2\text{-}N}$ of the array 32 would pass respectively through the locations $L'_{2\text{-}N}$ of the spatial axis of the slit 16.

From the slit 16, the spatially located spectral distributions $B_{1,2, \ldots N}$ travel through the beam splitter 14, the collimator 50 and the optics module 62 and are received at the array of pixels P in the sensor 64. Referring again to FIG. 3, the collimator 50 and the optics module 62 focus the spectral distribution $B_1$ upon a row $R'_1$ in the array of pixels of the sensor 64, the spectral distribution $B_2$ upon a row $R'_2$ in the array of pixels of the sensor 64, and so on.

Thus, in operation of the generator 10, each row R of mirrors 33 in the array 32 creates an individually programmed spectrum that is projected to a predetermined location of a linear scene, such that each location in the projected scene contains a plurality of individually programmed spectrum. The number of available projection locations of a scene, where each location includes predetermined spectral bands, is preferably equal to the number of rows of mirrors in the array. In other words, referring to FIG. 3, each of the rows of mirrors in the mirror array can be controlled to generate a spectral band projection for a corresponding pixel of a sensor of the hyperspectral system 60 under test. In an alternative preferred embodiment, a plurality of rows of the mirror array can be used to generate a spectral band projection for a single pixel.

In a preferred embodiment, the scene data is representative of a target inserted into a previously measured scene and can be based on data representative of varying spectral signatures, atmospheric conditions, background conditions and clutter. Also, the scene data can provide that atmospheric transmission and other scene-deteriorating agents are applied to a projected scene. Thus, the inventive generator 10 can be used to test the capability of a hyperspectral imaging system as to identification of dangerous chemical and biological agents in a scene without exposing a natural region to these dangerous agents or where the agents are otherwise not readily available for use in a natural region to be imaged. Additionally, the scene data can include expected spectral content representative of a countermeasure including many spectral components that can be expected to be present in an imaged region for a military application of the hyperspectral imaging system.

In a further preferred embodiment, the mirrors of the mirror array, the dispersion device and the optical energy source of the generator 10 can be suitably modified and selected to provide for generation of a projected scene having spectral energy at desired ranges within the VNIR/SWIR and also to the MWIR/LWIR spectral bands. For example, the generator can be designed to project a linear scene upon a single pixel hyperspectral imaging system having the following specifications: spectral range for VNIR and SWIR is 0.4–2.5 mm, MWIR is 3–5 mm and LWIR is 8–12 mm; projected field of view is 1–15 degrees; field of regard is 1–30 degrees; spectral resolution is 4 nm for VNIR, 5 nm for SWIR, 10 nm for MWIR, and 20 nm for LWIR; spatial resolution is 0.01–2 mrad; aperture is 3–25 cm; spectral radiance range is 120% Albedo $\lambda<2.5$ mm and +40° C. above ambient blackbody $\lambda>2.5$ mm; dynamic range is 10 bits at full frame rate; wavelength accuracy is ±1 nm; radiance accuracy 10%; calibration downtime is <10% of run time; and temporal scene projection is 250 Hz at the maximum frame rate. It is noted that the generator 10 can be used to test various hyperspectral systems by changing the aperture and effective focal length of the collimator 50 to satisfy particular hyperspectral system resolution and field of view requirements.

Thus, the inventive hyperspectral scene generator has many advantageous applications for testing of a hyperspectral imaging system. The generator 10 can be programmed to suitably control the positioning of the mirrors of the array, such that the output spectral radiance of a projected scene can be varied on a frame-by-frame basis, as may occur in a natural scene. In addition, the movement or frame timing of the mirrors of the array can be synchronized with the detection operation of the system 60 to provide that a series of slit images are produced to simulate the scene as it would be detected by typical scene scanning patterns of a hyperspectral sensor of a hyperspectral system, such as that of a dispersive pushbroom hyperspectral scanner.

Further, the generator 10 can be operated so that a target is inserted into several different projected scenes that duplicate the spectral content of real targets and background and also moving targets. As a result, the generator 10 can be used to evaluate the target software and also simultaneously detect anomalies in the operation of the sensor of the hyperspectral imaging system that can influence the ability of the hyperspectral system to identify a target. In other words, the generator 10 can be used to perform end-to-end testing of a hyperspectral sensor having a linear field of view by generating a projected scene including a target and arbitrary spectral content.

In addition, the targeting software can be further developed and refined to account for scene dynamics and target software algorithm sensitivities relative to target detection characteristics, and then readily and easily tested and validated using the generator 10 without the need for performing expensive data collection flights or other field testing.

Also, the generator 10 can be operated to validate its hyperspectral projection capabilities with relative ease by providing scene data used to generate the projected hyperspectral scenes directly to existing target software of the hyperspectral system. Thus, the target software and the generator performance can be simultaneously evaluated.

Further, the programmable controllability of the generator 10 permits that completely controllable and repeatable operational tests can be performed on various hyperspectral sensors, such that the performance of many sensors can be compared under identical scene conditions.

Also, the generator 10 can be used to facilitate hardware-in-the-loop (HIL) testing of all performance aspects of a hyperspectral imaging system by suitably controlling the spectral and spatial characteristics of a projected linear scene generated by the generator 10.

Although preferred embodiments of the present invention have been described and illustrated, it will be apparent to those skilled in the art that various modifications may be made without departing from the principles of the invention.

What is claimed is:

1. A hyperspectral scene generator comprising:

a broadband optical energy source for linearly radiating energy having wavelengths within a predetermined bandwidth;

an energy dispersion device for dispersing the radiated energy into predetermined spectral bands having respective predetermined positions across a spatial axis and for directing the spatially positioned spectral bands;

a controllable deformable mirror array including a plurality of mirror locations, wherein each of the mirror locations is positioned for receiving at least one of the directed spectral bands and the mirror locations in a same column of the array are for receiving the same directed spectral band, wherein each of the mirror locations includes a mirror selectively movable to a first position and a second position, wherein when a mirror is in the first position substantially all of a directed spectral band received at the mirror location containing the mirror is reflected and wherein when a mirror is in the second position substantially none of a directed spectral band received at the mirror location containing the mirror is reflected; and a controller for controllably moving each of the mirrors of the array for selectively reflecting the spectral band directed to the corresponding mirror location, wherein the controller receives scene data representative of a simulated scene having a plurality of scene locations and wherein each of the scene locations includes at least one spectral band at a predetermined power level, wherein the controller generates, based on the scene data, control signals for selectively moving the mirrors of the array such that the mirrors located in a same row of the array selectively reflect the directed spectral bands corresponding to the spectral bands associated with a scene location of the simulated scene.

2. The generator of claim 1, wherein the dispersion device receives the spectral bands reflected by the mirrors of the mirror array and, for each of the rows of the mirrors, projects the received reflected spectral bands to a different predetermined projection location.

3. The generator of claim 1, wherein the controller generates control signals for moving the respective mirrors of the array to the first and the second position in accordance with predetermined powers corresponding to the spectral bands for the respective scene locations.

4. The generator of claim 3, wherein the controller includes a pulse width modulator for generating a switching signal that controls what fraction of a predetermined clock cycle a mirror of the array is maintained at the first position, wherein the clock cycle is a function of an integration period of a sensor of a hyperspectral imaging system.

5. The generator of claim 1, wherein, for each of the rows of the mirrors in the deformable mirror array, the dispersion device redirects the spectral bands reflected by the mirrors of the row to a different predetermined location, the generator further comprising:

a collimator having an exit aperture for causing the scene to be projected upon a region spaced a predetermined distance from the collimator, wherein the dispersion device is positioned at the focal plane of the collimator.

6. The hyperspectral scene generator of claim 1, wherein the broadband source includes an adjustable slit.

7. The hyperspectral scene generator of claim 1 further comprising:

an adjustable slit for receiving the reflected spectral bands projected by the dispersion device.

8. A method for generating a hyperspectral scene comprising:

supplying a linear field of radiance having wavelengths within a predetermined bandwidth;

dispersing the radiated energy into predetermined spectral bands having respective predetermined positions across a spatial axis;

directing the spatially positioned spectral bands upon a deformable mirror array including a plurality of mirror locations, wherein each of the mirror locations is positioned for receiving at least one of the directed spectral bands and the mirror locations in a same column of the array are for receiving the same directed spectral band, wherein each of the mirror locations includes a mirror selectively movable to a first position and a second position, wherein when a mirror is in the first position substantially all of a directed spectral band received at the mirror location containing the mirror is reflected and wherein when a mirror is in the second position substantially none of a directed spectral band received at the mirror location containing the mirror is reflected;

controllably moving each of the mirrors of the array for selectively reflecting the spectral band directed to the corresponding mirror location, wherein the mirrors of the array are controllably moved to the first and second positions based on scene data representative of a simulation scene having a plurality of scene locations and wherein each of the scene locations includes at least one spectral band at a predetermined power level; and projecting the spectral bands reflected by the mirrors in a same row of the array to a predetermined projection location, wherein each of the rows of mirrors in the array corresponds to a different predetermined projection location.

* * * * *